(12) United States Patent
Pal et al.

(10) Patent No.: US 11,410,075 B2
(45) Date of Patent: Aug. 9, 2022

(54) CONTEXTUALLY-AWARE RECOMMENDATIONS FOR ASSISTING USERS WITH TASK COMPLETION

(71) Applicant: MICROSOFT TECHNOLOGY LICENSING, LLC, Redmond, WA (US)

(72) Inventors: Manjot Singh Pal, Redmond, WA (US); Bernd Ingo Plontsch, Redmond, WA (US); Tae Hun Kim, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 577 days.

(21) Appl. No.: 15/871,806

(22) Filed: Jan. 15, 2018

(65) Prior Publication Data

US 2019/0220438 A1 Jul. 18, 2019

(51) Int. Cl.
*G06F 3/0482* (2013.01)
*G06N 20/00* (2019.01)
(Continued)

(52) U.S. Cl.
CPC ............ *G06N 20/00* (2019.01); *G06F 3/0482* (2013.01); *G06F 9/453* (2018.02); *G06F 9/5055* (2013.01);
(Continued)

(58) Field of Classification Search
CPC .................................................. G06F 3/0482
(Continued)

(56) References Cited

U.S. PATENT DOCUMENTS 8,301,364 B2 * 10/2012 Rolf .................. G01C 21/3617
707/706
8,731,902 B2 5/2014 Beld et al.
(Continued)

FOREIGN PATENT DOCUMENTS

CN 1816800 A 8/2006
EP 2587478 A2 5/2013

OTHER PUBLICATIONS

"International Search Report and Written Opinion Issued in PCT Application No. PCT/US2018/066986", dated Apr. 9, 2019, 10 Pages.
(Continued)

*Primary Examiner* — Daniel Rodriguez
(74) *Attorney, Agent, or Firm* — Jacob P. Rohwer; Newport IP, LLC

(57) ABSTRACT

A system for assisting users in making progress towards the completion of a task by recommending actions is provided. The techniques disclosed herein enable a system to receive user input signals, such as a voice input, a text input or any other type of input comprising phrases indicating a task. The system can then automatically generate recommendations for directing the user to complete the task. The techniques disclosed herein can also identify a contextually-relevant application that is most suitable for completing the identified task. For instance, a user may have several messaging applications. Based on a context of the user's input, and other historical data utilized by one or more machine learning engines, a system can recommend an appropriate application, or provide a ranking of the applications, suitable for completing an identified task. The techniques disclosed herein also employ machine learning engines to improve accuracy of the recommendations over time.

18 Claims, 11 Drawing Sheets

(51) Int. Cl.
*G06F 9/451* (2018.01)
*G06Q 10/06* (2012.01)
*G06F 40/216* (2020.01)
*G06F 16/9032* (2019.01)
*G06F 9/50* (2006.01)

(52) U.S. Cl.
CPC ...... *G06F 16/90324* (2019.01); *G06F 40/216* (2020.01); *G06Q 10/06316* (2013.01)

(58) Field of Classification Search
USPC .......................................................... 715/783
See application file for complete search history.

(56) References Cited

U.S. PATENT DOCUMENTS

| | | | | |
|---|---|---|---|---|
| 8,972,872 B2* | 3/2015 | Labrou | ..................... | G06F 8/00 |
| | | | | 715/744 |
| 9,075,508 B1* | 7/2015 | Cronin | .................. | G06F 3/0484 |
| 9,378,196 B1* | 6/2016 | Tomkins | ............... | G06F 40/279 |
| 9,740,751 B1* | 8/2017 | Yeom | ...................... | G06F 3/167 |
| 9,753,912 B1 | 9/2017 | Roy et al. | | |
| 9,754,016 B1* | 9/2017 | Bozarth | .................. | G10L 15/26 |
| 9,754,224 B2* | 9/2017 | Bradley | ................. | G06Q 10/06 |
| 10,261,672 B1* | 4/2019 | Dolbakian | .......... | G06F 3/04817 |
| 2013/0185292 A1* | 7/2013 | Li | ....................... | G06F 16/2457 |
| | | | | 707/723 |
| 2013/0219333 A1* | 8/2013 | Palwe | ............... | H04M 1/72403 |
| | | | | 715/810 |
| 2013/0346872 A1* | 12/2013 | Scott | .................... | G06F 40/232 |
| | | | | 715/810 |
| 2014/0032685 A1* | 1/2014 | Takahashi | ............... | H04L 51/00 |
| | | | | 709/206 |
| 2014/0033071 A1* | 1/2014 | Gruber | ............... | G06Q 10/1097 |
| | | | | 715/752 |
| 2014/0173625 A1* | 6/2014 | Kumar | .................. | G06F 9/4843 |
| | | | | 718/106 |
| 2014/0214898 A1* | 7/2014 | Shapira | .................... | G06F 16/48 |
| | | | | 707/769 |
| 2014/0280234 A1* | 9/2014 | Chang | .................. | G06F 16/951 |
| | | | | 707/749 |
| 2015/0254310 A1* | 9/2015 | Imaizumi | ............ | G06F 16/9535 |
| | | | | 707/723 |
| 2015/0278370 A1* | 10/2015 | Stratvert | ................ | H04L 67/32 |
| | | | | 707/766 |
| 2016/0086116 A1* | 3/2016 | Rao | ........................ | G06F 3/0481 |
| | | | | 705/7.21 |
| 2016/0099842 A1 | 4/2016 | Krishnamoorthy et al. | | |
| 2016/0171589 A1* | 6/2016 | Glover | ............... | G06Q 30/0631 |
| | | | | 705/26.7 |
| 2016/0299977 A1* | 10/2016 | Hreha | ................ | G06Q 30/0251 |
| 2016/0360382 A1* | 12/2016 | Gross | ...................... | G06F 3/016 |
| 2017/0024398 A1* | 1/2017 | Tomkins | ............... | G06F 16/3322 |
| 2018/0314552 A1* | 11/2018 | Kim | ........................ | G06F 3/167 |
| 2018/0336415 A1* | 11/2018 | Anorga | ................ | G06K 9/6267 |
| 2019/0066674 A1* | 2/2019 | Jaygarl | ................ | G06F 3/04886 |
| 2019/0080163 A1* | 3/2019 | Das | ........................ | G06V 10/17 |
| 2019/0377467 A1* | 12/2019 | Wang | ..................... | G06Q 10/10 |
| 2020/0097840 A1* | 3/2020 | Burns | ..................... | H04L 65/60 |

OTHER PUBLICATIONS

"Notice of Allowance Issued in European Patent Application No. 18842687.8", dated Feb. 11, 2022, 7 Pages.
"Notice of Allowance Issued in European Patent Application No. 18842687.8", dated Apr. 29, 2022, 2 Pages.
"Office Action Issued in Indian Patent Application No. 202047029623", dated Jun. 9, 2022, 7 Pages.

* cited by examiner

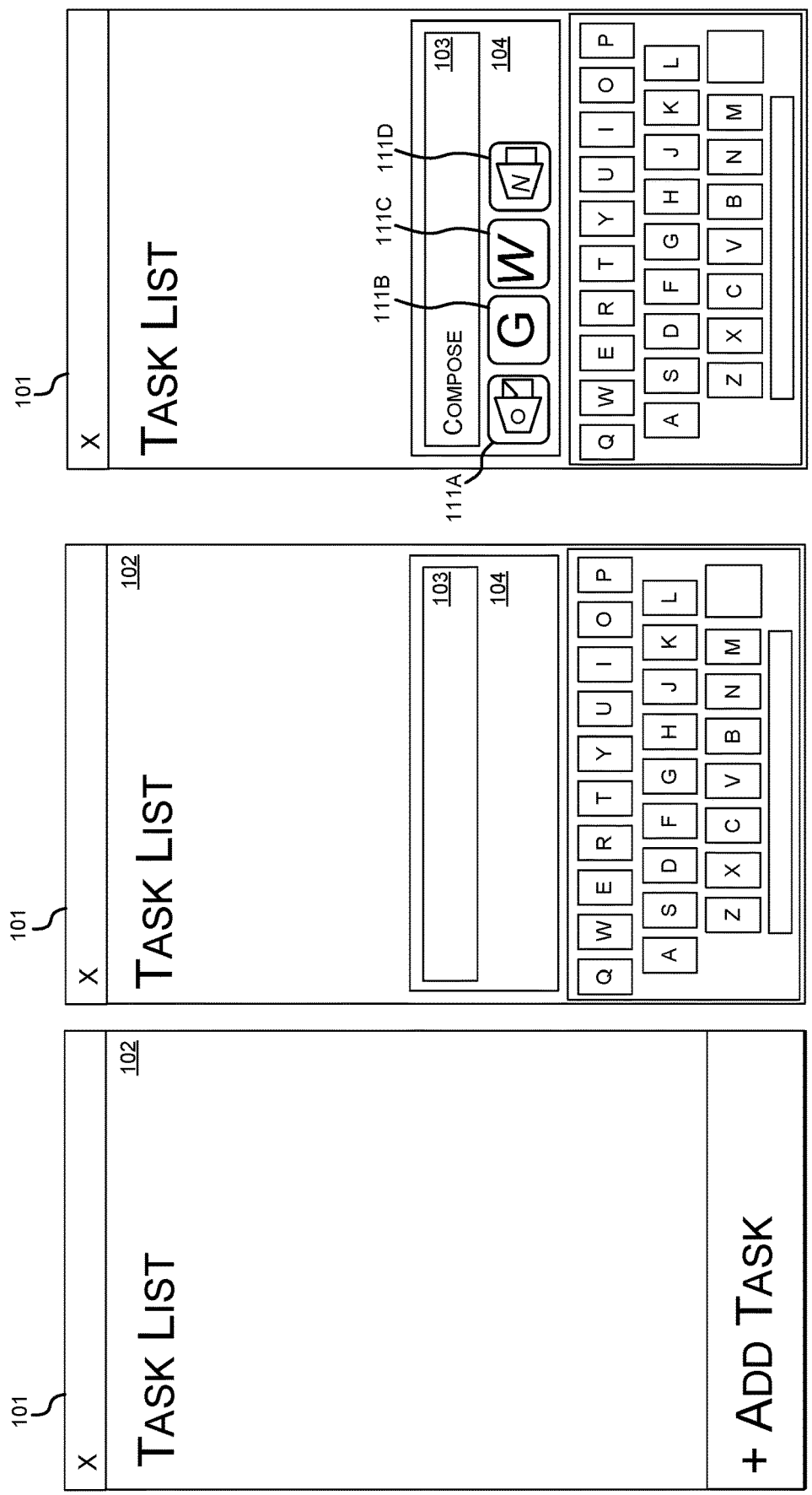

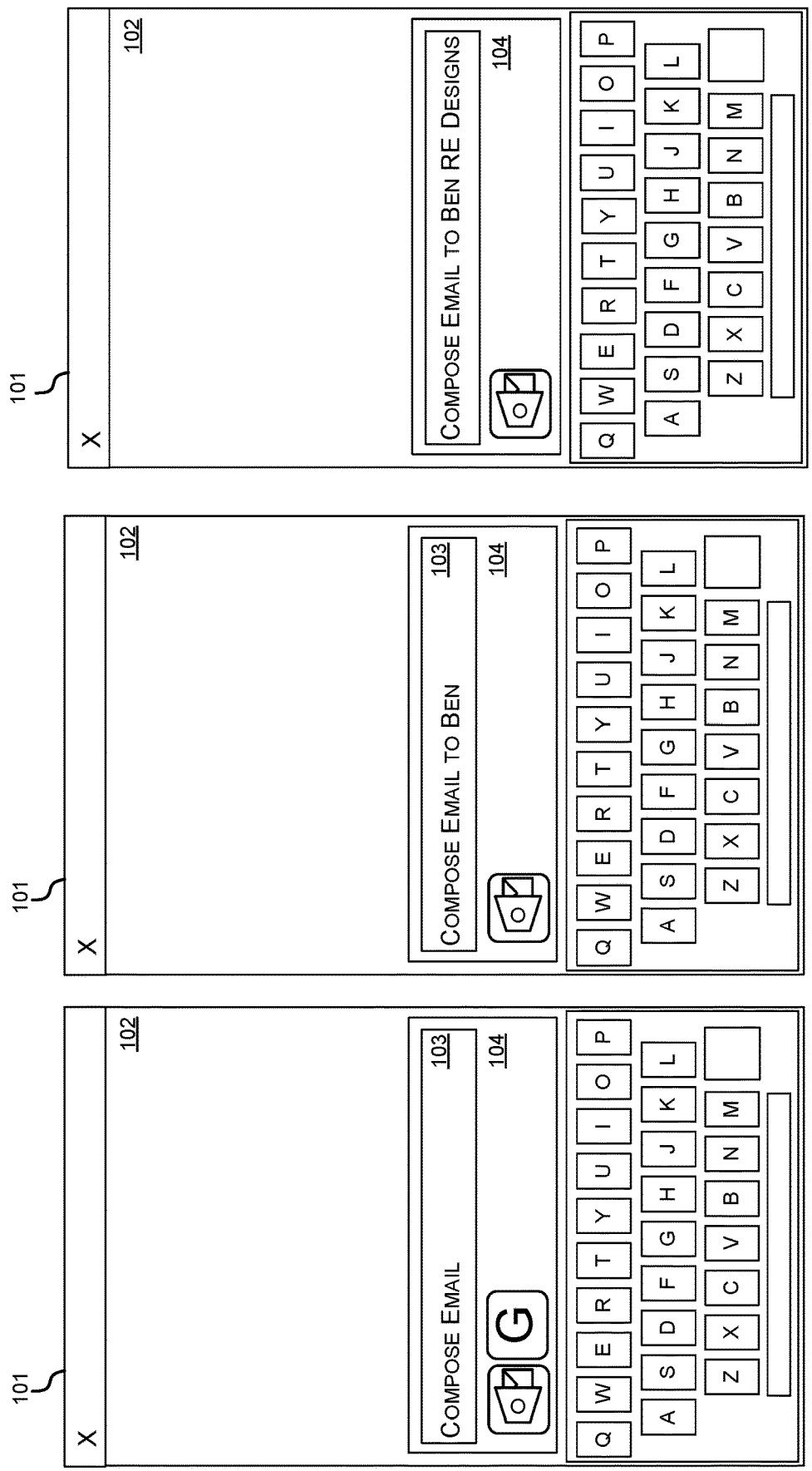

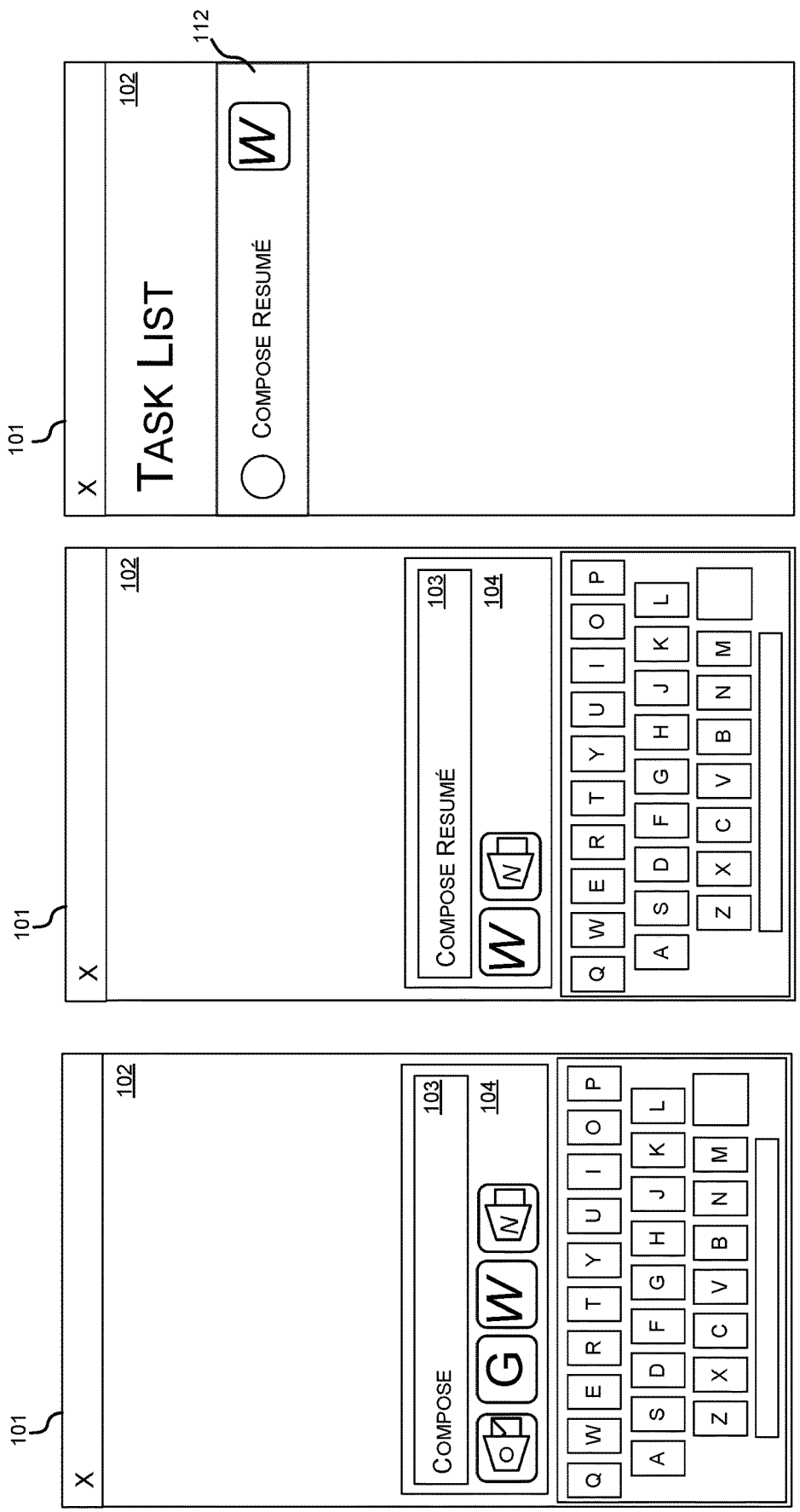

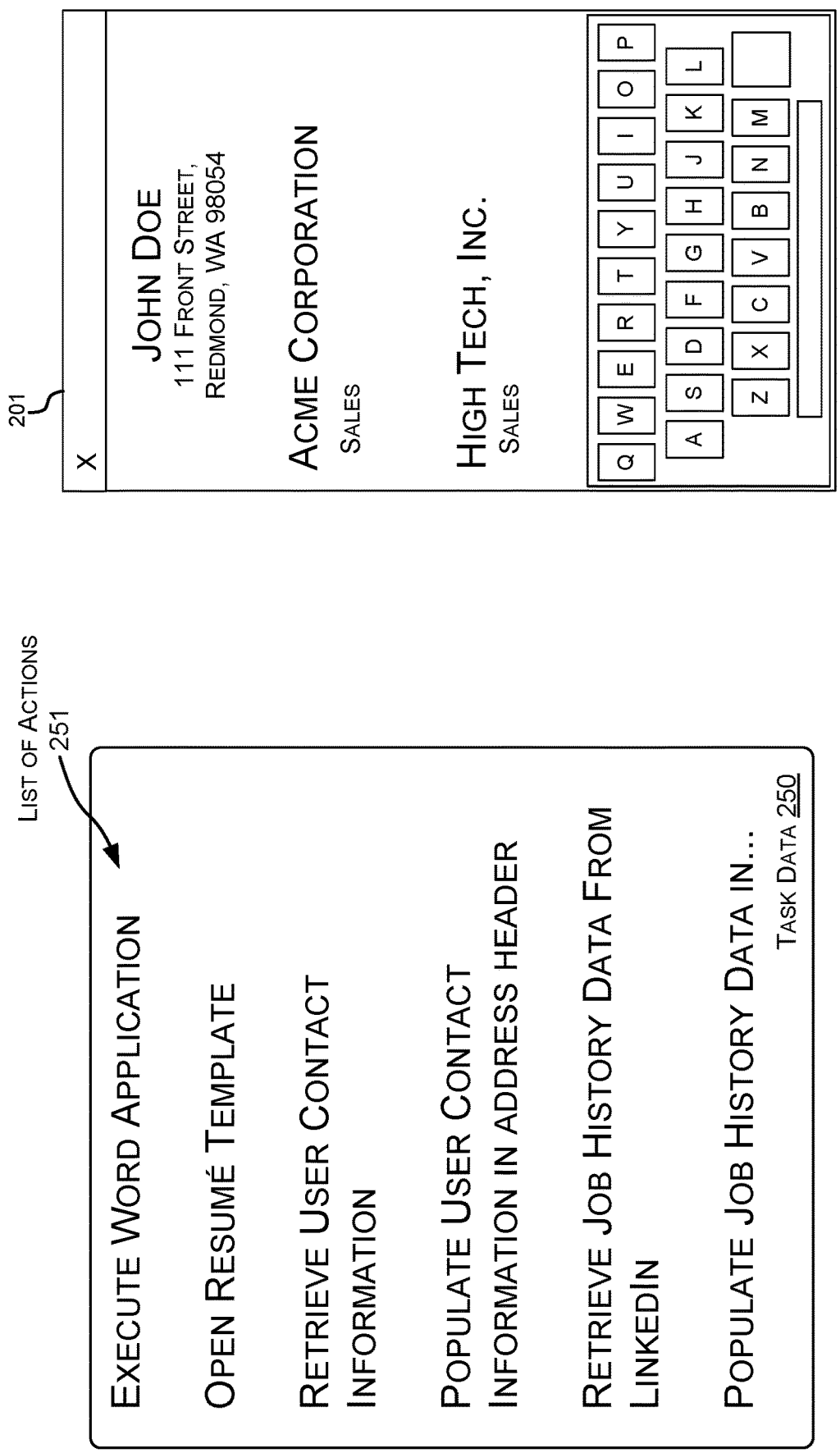

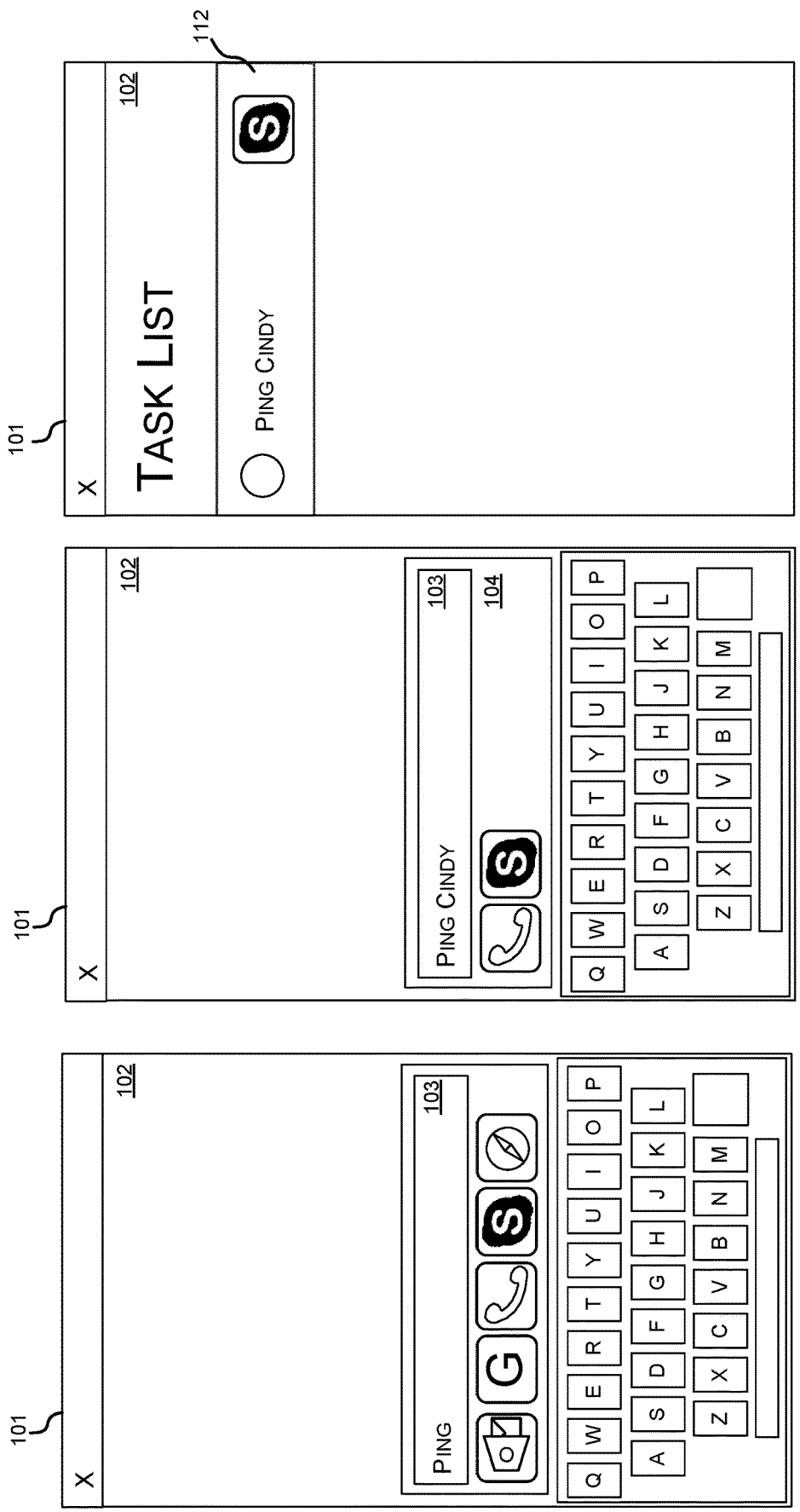

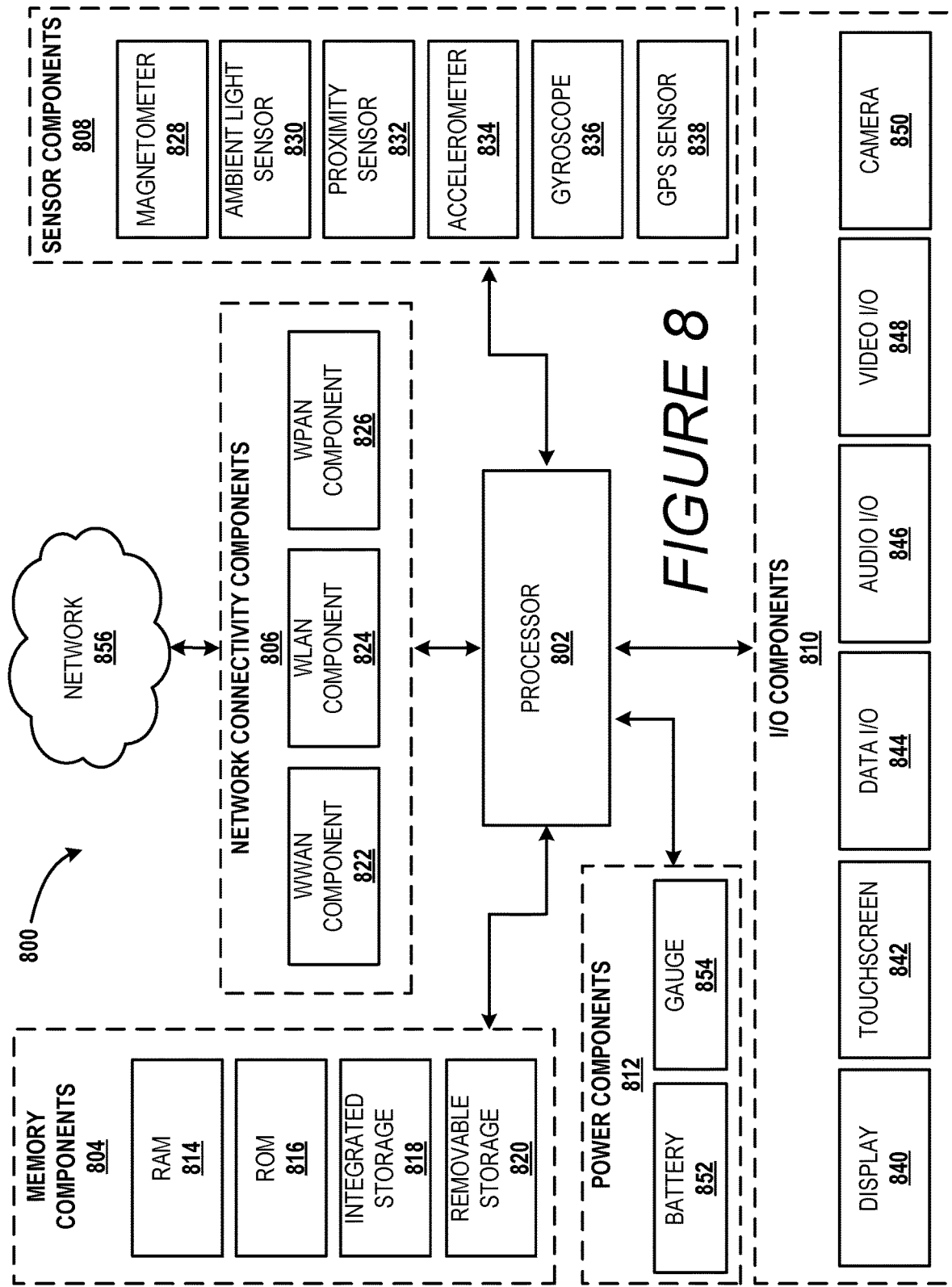

CONTEXTUALLY-AWARE RECOMMENDATIONS FOR ASSISTING USERS WITH TASK COMPLETION

BACKGROUND

In many productivity applications, such as Outlook, Word, Excel, OneNote, Pages, Numbers, Google Docs, and Google Sheets, each application has specialized features enabling users to communicate, manipulate, and otherwise process data. Although productivity applications can help users perform many different tasks, the complexity of each application grows as more features are added to each application. In some instances, a user may not know how to perform a particular task given all of the features of a particular application. Thus, some applications may not provide the best user experience or allow a user to fully benefit from its available features.

Some existing systems can assist users with some applications. For instance, Apple provides a voice-activated service that enables users to initiate phone calls or send text messages by the use of a voice command. Although these types of services are helpful in assisting users to make calls or send messages, these systems are static in nature, as they only allow for the use of a single application for a particular task. This limitation does not always provide the best user experience. For example, when a user says the command "Call Michael," the service initiates a phone call. Unfortunately, even if a user has a number of available communication applications to make a call, such services only use the phone application. Such existing services are not dynamic in nature, e.g., some services cannot identify and utilize a contextually-relevant application based on the user's circumstances. Such shortcomings can lead to the underutilization of applications, the underutilization of features within an application, etc.

SUMMARY

The techniques disclosed herein enable a system to assist a user in making progress towards the completion of a task by automating and/or recommending actions based on user input signals. The input signals can include a voice input, a text input, or any other type of input that includes phrases indicating a task. The input signals can be interpreted by a system to identify a user's intent. Based on data defining a user's intent, the system can generate data defining a number of actions to complete the task. The device can then automatically execute the actions for the user or generate one or more recommendations for directing the user to manually complete the task. The techniques disclosed herein can also identify a contextually-relevant application that is most suitable for completing the identified task. For instance, a user may have several messaging applications, e.g., a first application for personal messages, a second application for work messages, and a third application for volunteer work. Based on a context, e.g., a user's intent, of the user's input, and other contextual data, including historical data processed by one or more machine learning engines, a system can recommend an appropriate application, or provide a ranking of the applications, suitable for completing an identified task.

In one illustrative example, an input signal to a computing device can indicate that a user wants to "Send an email to Katie about a design sync." The computing device utilizes the input signal to generate data indicating a task to be done, e.g., the task of sending an email. The task can be determined by the analysis of a phrase or a set of keywords. The computing device can then select and rank appropriate applications suitable for performing the task. In some embodiments, applications are ranked based on an analysis of the input signal and/or contextual data. The contextual data can include any stored information with respect to a user's activity, such as a user's location, a date, and/or a time of day. The contextual data can also include a user's historical activity data that is collected and processed by a machine learning engine. A list of the ranked applications can be displayed to a user for selection.

The computing device can also generate data defining a list of actions associated with the task. In the present example, the actions can include instructions or code for causing a computer to execute a selected email application, and populate one or more fields within the email application, such as an email address, subject line, etc. The data that is utilized to populate fields within an application can be retrieved from the input signals, or such data can also be retrieved from other resources such as a database, a mail server, a remote storage service, etc. Based on the input signal and/or other contextual data, the computing device can also identify and recommend one or more attachments to include in the email, language to be used in the email, etc. The list of actions can be displayed to the user to enable the user to complete a task, or the list of actions can be used by the computing device to automatically complete the list of actions. The content including the list of actions available to be performed can be displayed to the user, and such content can be in any format that helps the user progress towards the completion of a given identified task. The content, for instance, can include text, audio data, and/or video data. The content can also include code or data for causing an application or a system to automate one or more actions.

The techniques disclosed herein also utilize machine learning techniques for selecting and/or ranking recommendations for the task to be performed. For instance, a confidence score can be generated based on a user's past patterns. The confidence score can then be used to rank recommendations. As will be described in more detail below, this feature enables the system to provide dynamically adjusted rankings of recommended applications that are based on past identified user activity. Such machine learning techniques can be used to develop an understanding of the intentions of a user and/or one or more selected actions that are possible for completing a task. The features disclosed herein enable a computing device to provide dynamically-aware recommendations that adjust to a user's circumstances and changing scenarios. The features disclosed herein also help users with the utilization of a broad range of applications, and help users utilize and discover features within an application.

It should be appreciated that the above-described subject matter may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interaction with a device may be improved as the use of the techniques disclosed herein enable a user to view a wide range of file types available for task performance while staying on one Website. In addition, improved human interaction improves other computing resources such as processor and network resources, e.g., users can stay on one Website and reduce interaction, traffic and computer cycles.

Other technical effects other than those mentioned herein can also be realized from implementations of the technologies disclosed herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A is a screenshot of a user interface for a task application displaying an empty task list.

FIG. 1B is a screenshot of the user interface of FIG. 1A showing one example embodiment of a mechanism for providing an input signal to the task application.

FIG. 1C is a screenshot of the user interface showing a recommendation of ranked applications based on an input signal indicating a task.

FIG. 1D is a screenshot of the user interface of FIG. 1C showing an update to the ranking of the applications based on an update to the input signal.

FIG. 1E is a screenshot of the user interface of FIG. 1C showing an update to the recommendation of applications based on an additional update to the input signal.

FIG. 1F is a screenshot of the user interface of FIG. 1C showing additional updates to the input signal.

FIG. 1G is a screenshot of the user interface of FIG. 1A illustrating an update to the task list.

FIG. 1H is a screenshot of a user interface of a selected application utilized for performing a task item on the task list.

FIG. 2A is a screenshot of a user interface for displaying a recommendation including a list of available applications displayed in response to a user input comprising a single word.

FIG. 2B is a screenshot of the user interface of FIG. 2A showing an update to the list of available applications displayed in response to additional user input.

FIG. 2C is a screenshot of the user interface showing a task item displayed in response to the selection of an application displayed in the recommendation.

FIG. 2D illustrates one example of task data that can be generated in association with the task item.

FIG. 2E illustrates an example of a user interface of an application used for performing the task of the task item shown in FIG. 2D.

FIG. 3A is a screenshot of a user interface for displaying a recommendation including a list of available applications displayed in response to a user input comprising a single word.

FIG. 3B is a screenshot of the user interface of the recommendation shown in FIG. 3A showing an update to the list of applications displayed in response to additional user input.

FIG. 3C is a screenshot of the user interface showing a task item displayed in response to the selection of an application displayed in the recommendation.

FIG. 8 is a computer architecture diagram illustrating a computing device architecture for a computing device capable of implementing aspects of the techniques and technologies presented herein.

DETAILED DESCRIPTION

Figure 4B:
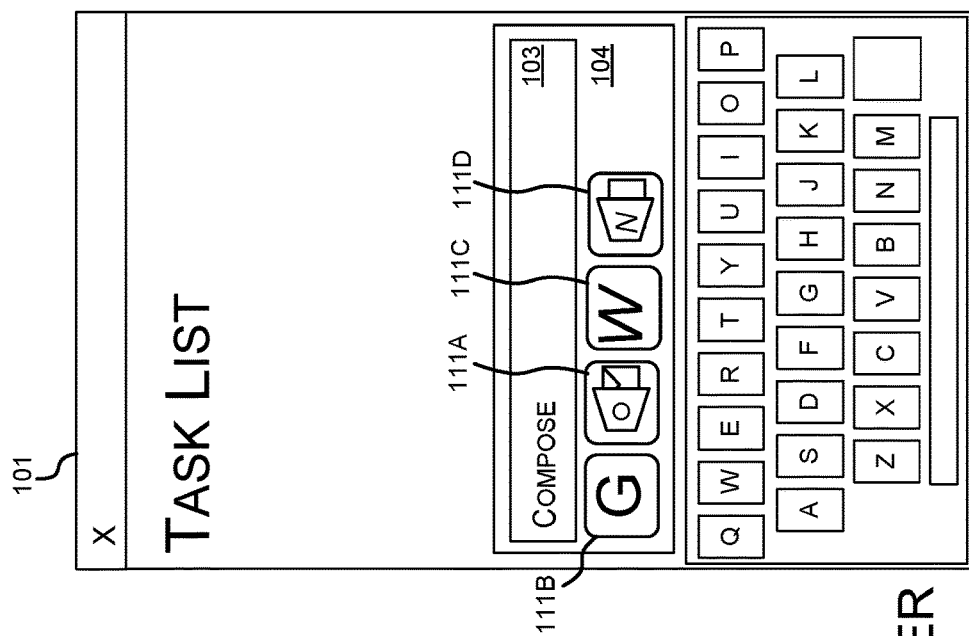
FIG. 4B illustrates how the ordered list of applications of FIG. 4A can be updated over time based on user activity.

The techniques disclosed herein enable a computer system to assist a user in making progress towards the completion of a task to be performed by automating and/or recommending actions based on user input signals. The input signals can include a voice input, a text input or any other type of input including phrases indicating a task. The input signals can be interpreted by the system to identify a user's intent. Based on a user's intent, the system can generate data defining a number of available actions to complete the task. The device can then automatically execute the actions for the user or generate one or more recommendations for directing the user to manually complete the task. The techniques disclosed herein can also identify a contextually-relevant application that is most suitable for completing the identified task. For instance, a user may have several messaging applications, e.g., a first application for personal messages, a second application for work messages, and a third application for volunteer work. Based on a context of the user's input, and other historical data utilized by one or more machine learning engines, a system can recommend an appropriate application, or provide a ranking of the available applications, suitable for completing an identified task.

It should be appreciated that the subject matter described herein may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interaction with a device may be improved as the use of the techniques disclosed herein enable a user to gain an understanding of the applications that can be utilized for a particular task. The techniques disclosed herein can also display the best applications that can be utilized for performing a particular task. Such features provide improvements over existing systems in that a user may discover a more optimal application or service for performing a task, which can save a number of computing resources including network bandwidth, processing power, memory usage, etc.

Other technical effects other than those mentioned herein can also be realized from implementations of the technologies disclosed herein.

Turning now to FIGS. 1A-1I, a number of screen shots are used to illustrate an example scenario utilizing the techniques disclosed herein. This example involves a scenario where a user interacts with a mobile device. Although a mobile device is utilized in this example, it can be appreciated that the techniques disclosed herein can apply to any computing device (such as the computing devices 600 in FIG. 6, the client devices 706 in FIG. 7, and the computing device 800 shown in FIG. 8), such as a tablet, laptop, etc. In this example, a user interacts with a task application to generate task items. Applications can be recommended to the user based on the user input signals. Although recommended applications are used to illustrate aspects of the present disclosure, it can be appreciated that the techniques disclosure herein can recommend and/or rank services, which may be executed on a local device or a remote device, or other types of software modules such as plug-ins, scripts, macros, etc. As shown in the corresponding figures and described below, the applications are dynamically recommended and ranked based on the input signals and other contextual data.

FIG. 1A is a screenshot of a user interface 101 displaying a task list 102. To add a task item to the task list 102, a user can select the "Add Task" graphical element. In response to the selection, as shown in FIG. 1B, the device displays a text field 103 and a recommendation field 104.

As shown in FIG. 1C, the user begins providing an input signal. In this illustrative example, the user enters the word "compose." In response to receiving this input signal, the computing device analyzes the word to determine an intent of the user. In some configurations, the word "compose" and other keywords can be associated with one or more applications. By an association between keywords and one or more applications, the computing device can select and recommend a number of applications appropriate for carrying out a task associated with the given word. As disclosed herein, the selected applications are provided as a recommendation to the user.

In some configurations, the selected applications are ranked according to a confidence score. A confidence score can be determined using a number of factors. For instance, a confidence score can be based on keywords that are provided in the input signal. In addition, a confidence score can be based on history data indicating user activity. The history data may describe a number of times a user has selected a particular application, or a number of times the user has selected a particular application in association with a particular keyword. Other contextual data and any suitable machine learning algorithms can be utilized to determine a confidence score for each individual application. The individual applications can be ranked based on a confidence score.

In the example shown in FIG. 1C, the recommended applications are ranked based on the confidence score; the application with the highest confidence score is positioned on the left, followed by applications that are arranged by the confidence score, the application with the lowest confidence score positioned on the right. In this example, with a single word entered by the user, the recommendation field 104 lists a ranked order of applications: Outlook 111A, Gmail 111B, Word 111C, and OneNote 111D.

As summarized above, the recommendation field 104 can be dynamically updated based on signals received from the user. FIG. 1D illustrates the dynamic nature of the recommendation field 104. As the user provides updated signals, in this case as the user adds the word "email," to the word "compose", the recommendation is dynamically updated. As shown, the recommendation field 104 only shows contextually relevant recommendations given the updated phrase "compose email." The recommendation field now only lists Outlook and Gmail. Thus, in some configurations, certain keywords can be used as a filter to remove applications from the recommendation field 104.

The present example continues at FIG. 1E, where the recommendation is updated further based on the input signal and contextual information. As the user continues to add text to the text field 103, e.g., the user adds a name to the phrase, "Compose email to Ben." In this example, it is a given that Ben is a coworker thus, a corporate or enterprise email application such as Outlook is selected. Thus, certain applications, such as a Gmail application, can be categorized as an application that is used for personal contacts or personal use, while other applications, such as Outlook can be used for work contacts or for work purposes. Thus, in response to identifying a name that is identified as a coworker, as shown in FIG. 1E, the recommendation field 104 is updated to only show the Outlook application. In this example, if a name of a personal contact were to be included in the input signal, the Gmail application may be ranked higher and positioned to the left of the Outlook application.

The present example continues at FIG. 1F, where the user continues to add to the text field 103. In this example, the user completes the input signal by adding "RE designs" and the phrase "compose email to Ben RE designs" is completed. As an input signal is received, the input signal is dynamically parsed and keywords are identified. As described above, keywords that are associated with one or more applications can change the recommendation, and other keywords can be used to populate data fields of the selected application. As described below, the additional text provided in FIG. 1F is utilized to populate fields within the selected application.

In the present example, the user can add a task item to the task list by selecting any one of the recommended applications in the recommendation field 104. In the example shown in FIG. 1F, the user selects the Outlook icon to initiate the generation of a task item. FIG. 1G shows the task list 102 comprising the task item 112 generated in response to the selection of the outlook icon shown in FIG. 1F. Additional task items 112 can be added to the task list 102 by repeating the steps described above.

To complete a task item 112 listed in the task list 102, a user can select the task item 112. In response to the selection, as shown in FIG. 1H, the computing device executes the selected application. In the present example, Outlook is executed and a new email message user interface is displayed. As described above, selected keywords from the input signal and other supplemental data retrieved from one or more resources can be used to populate fields. For instance, an email address associated with the name included in the input signal can be retrieved from an address book, database, etc. Also in this example, certain keywords from the input signal, such as the word "designs" can be included in the subject field. Other data such as a greeting or other text can be included in the body of the email. Keywords of the input signal and other user activity can also be analyzed to determine a user's intent. For example, if a user has been working on a file related to a "design," those files may be automatically attached to the email or referenced in the email body. In other embodiments, related files can also be displayed as a recommendation to the user along with an action, such as "attach related file," etc.

FIG. 2A illustrate another user scenario utilizing the techniques disclosed herein. As shown in FIG. 2A, an example input signal includes the word "compose." In response to this input, the computing device displays a number of applications related to the entered keyword: Outlook, Gmail, Word, and OneNote. As shown in FIG. 2B, the user continues to enter text and provides an input "compose resume." In response, the computing device displays all of the applications related to the entered phrase as it is being entered. The computing device dynamically analyzes the phrase to determine the associated applications, which in this example include the narrowing of the associated applications to Word and OneNote. In some configurations, applications can be re-ordered in this scenario. Thus, instead of having the Outlook and Gmail applications disappear from the recommendation, an updated list can re-order the applications so that the Word and OneNote applications are ranked as higher priority applications, e.g., they are positioned to indicate a higher ranking, and that the Gmail and Outlook applications are ranked as lower priority applications.

In this example, it is a given that the user selects the Word application. In response to receiving a user selection of the Word application in FIG. 2B, the computing device can update a task list 102 with a task item 112 as shown in FIG. 2C. As shown, the task item 112 can include an indication of the selected application and one or more aspects of the input signal.

As described above, when a task item 112 is generated, the computing device can generate task data that defines one or more actions that are used to complete a task. FIG. 2D illustrates a portion of some example task data 250 that includes a list of actions 251. As shown, the task data 250 includes a number of actions such as execute Word application, open resume template, retrieve user contact information, populate user contact information in the address header, etc. Such actions can be generated based on the input signal provided by a user, user history data, and/or contextual data retrieved from one or more resources. The task data 250 can be in any suitable format, which may include a script, code, macro, or any other instructions that define computer-implemented actions for completing a task. Thus, when a user selects a task item 112 from the task list 102, a computing device may execute the actions defined in the task data 250.

In the present example, when the user selects the task item 112 shown in FIG. 2C, the actions defined in the task data 250 can be executed. The execution of the task data 250 can result in the display of a Word file having pre-populated fields as shown in FIG. 2E.

FIG. 3A through FIG. 3C illustrate another example scenario showing the dynamic nature of the recommendations. In this example, as shown in FIG. 3A, a user may provide an input signal indicating the word "ping." Given that this word can be used in association with a number of applications, several applications may be recommended. In this example, in response to the input signal including a single word, "ping," a number of applications suitable for performing a "ping" is displayed. In this example, the recommendation includes a ranked list of applications: Outlook, Gmail, a phone application, Skype, and a browser.

As the user continues to provide input to the computing device, the ranked list of applications dynamically changes based on the user's intention, which can be determined by an analysis of the input signal and other contextual data described herein. In the example of FIG. 3B, when the phrase includes "Ping Cindy," the recommendation field 104 only includes the phone application and Skype. Such an update can be based on a number of factors. For instance, historical user activity data can indicate that the user has used these applications to communicate with this particular contact, Cindy, in the past. The ranking of the applications can be based on a number of instances the user has utilized each application. For instance, in the example of FIG. 3B, the phone application may be ranked higher than the Skype application because the phone application may have a higher number of uses and/or a higher number of occurrences with this particular contact, Cindy. Thus, the Skype application may be ranked higher for another contact. For example, in response to an input signal to "Ping Michael," the task application may rank the Skype application above the phone application if the Skype application was used more than a threshold number of times compared to the phone application. A threshold and/or a comparison of a number of times an application is used can be processed by a machine learning engine for determining a confidence score for each application and/or a ranking of each application.

When the signal includes an object or a contact name that is associated with two different categories of applications, one or more factors derived from received contextual data can be used to determine a confidence score or a ranking of an application. For example, if the name Cindy is included in the input signal, and there happens to be a first Cindy in the user's family and a second Cindy at the user's office, one or more factors can be used to determine an appropriate application. In one specific example, a time of day or date can be used to determine a confidence score or a ranking of an application. For instance, if the user is creating the task during work hours, the task application may determine that the user intends to contact his or her co-worker. In this case, an Enterprise application such as Skype may be scored or ranked higher than a phone application. However, if the user is creating the task during evening hours, the task application may determine that the user intends to contact his or her family member. In this case, a personal application such as the phone application may be scored or ranked higher than an Enterprise application such as Skype. The same methods can be used for other contextual data, such as a day of the week, a location, etc. For instance, if the task is created while the user is at work, the Skype may be scored or ranked higher than a phone application, and if the task is created while the user is at home, the phone application may be scored or ranked higher than an Enterprise application such as Skype.

Each application may also be associated with a category, e.g., personal use, official use, etc. In addition, each contact name may be associated with at least one of the categories. Thus, when a contact name is included in an input signal, applications sharing the same category as the contact name may have a higher confidence score than other applications. At the same time, other factors, such as a time of day, a date, a day of the week, a location of the user, or contextual data describing any scenario related to the user, can be associated with a category. When an input signal indicates any one of these factors, applications sharing the same category as such factors may have a higher confidence score than other applications.

As shown in FIG. 3C, the computing device can generate a task item 112 to "Ping Cindy," and the task item is displayed on a task list 102. This task item may be generated in response to the user selection of a particular application listed in the recommendation field 104, or the highest-ranking application may be automatically selected, which may occur after a predetermined period of time after the recommendation is displayed. In this example, the user has selected the Skype application shown in the recommendation field 104. In response to the selection, the Skype application is associated with the task and displayed in association with the task item 112.

The computing device can also generate task data that associates the task item 112 with the selected application, e.g., Skype. The computing device may also generate and process task data comprising a number of actions that can be used to perform the task defined in the task item 112. For instance, task data can be used to cause a computing device to retrieve a phone number, an identifier, or any other information needed to make a call or generate a text message, and such information can be stored in association with the task item. Thus, when a user selects the task item 112, the computing device can utilize the retrieved information to carry out the task. In this example, the task application may cause the execution of the Skype application and populate one or more fields within the Skype application to facilitate a call or to generate a message to a particular user. In this example, Cindy's contact information is retrieved from the phone book or another database, and the contact information may be stored within the task data.

Figure 4A:
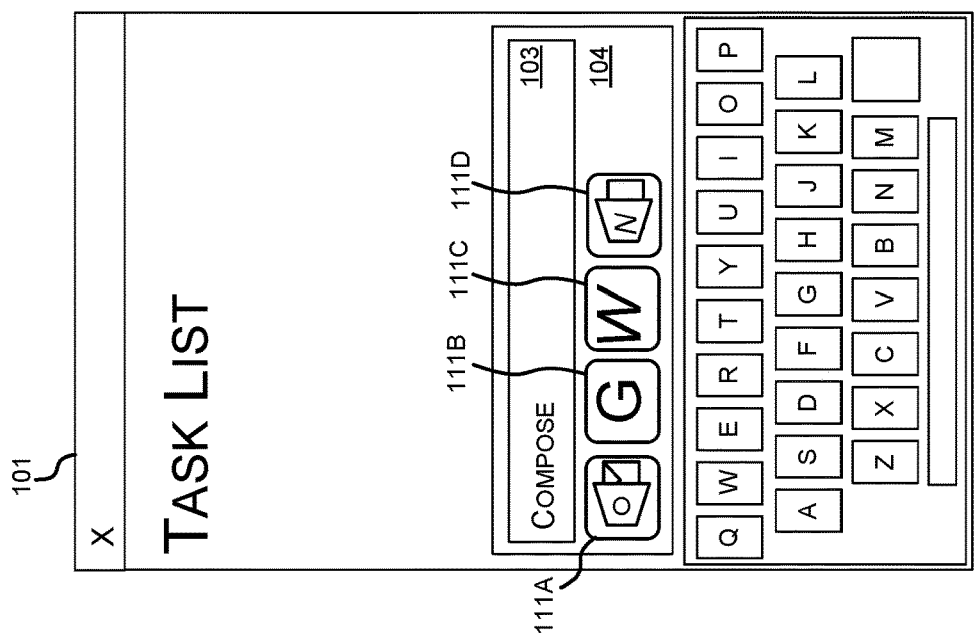
FIG. 4A illustrates a recommendation showing an ordered list of applications.

FIG. 4A and FIG. 4B illustrate how a ranking of applications can change over time. FIG. 4A shows a recommendation list having a rank list of applications. In this example, the applications may be ranked by a confidence score based on keywords in the input signal and/or other contextual data. As described above, a ranked list may change over time as user activity data is continually dynamically updated. Thus, after a user has made a threshold number of selections of an application thereby changing a confidence score of that application, the order in which that particular application is displayed relative to other applications in a rank list may change over time. Such embodiments can use a machine learning engine to store and analyze user history activity data to update confidence scores and determine when an order of application recommendations is to be updated.

In the present example, it is a given that the second application has been selected a threshold number of times. When the second application, the Gmail 111B application, is selected a threshold number of times, based on user activity data generated by one or more machine learning engines, a confidence score associated with the second application may increase to a threshold level where the second application is listed as the highest priority, as shown in FIG. 4B.

The confidence score can be determined by the use of a number of different factors. For instance, the confidence score may be determined by an analysis of keywords in the phrase and/or user activity data ("historical data"). In some configurations, machine learning techniques may be utilized to analyze a user's activity history, e.g., which applications have been used in the past for a particular task. As the user interacts with the computer, user activity data is stored and analyzed by one or more machine learning techniques.

The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of an application that is relevant to a user's intent and/or situation. Different factors can be used to influence the selection and/or the ranking of an application such as a number of times a user has utilized an application, how recently a user has utilized an application, etc. In addition, machine learning techniques can be utilized to determine a user's intent based on any conditional data referred to herein. Thus, activity and circumstances related to objects and/or people included in the phrase can be utilized to select and/or rank an application, e.g., determine a confidence score.

Different machine learning mechanisms may be utilized. For example, a classification mechanism may be utilized to determine a confidence score. The classification mechanism may classify the applications, keywords or phrases into different categories that provide an indication of whether a particular application is suitable for a task. A confidence score can be associated with each application. In some configurations, more classification categories may be utilized. In other examples, a statistical mechanism may be utilized to determine a confidence score. For example, a linear regression mechanism may be utilized to generate a confidence score that indicates a likelihood that an application is associated with a particular task. Linear regression may refer to a process for modeling the relationship between one variable with one or more other variables. Different linear regression models might be used to calculate the confidence score. For example, a least squares approach might be utilized, a maximum-likelihood estimation might be utilized, or another approach might be utilized.

Figure 5:
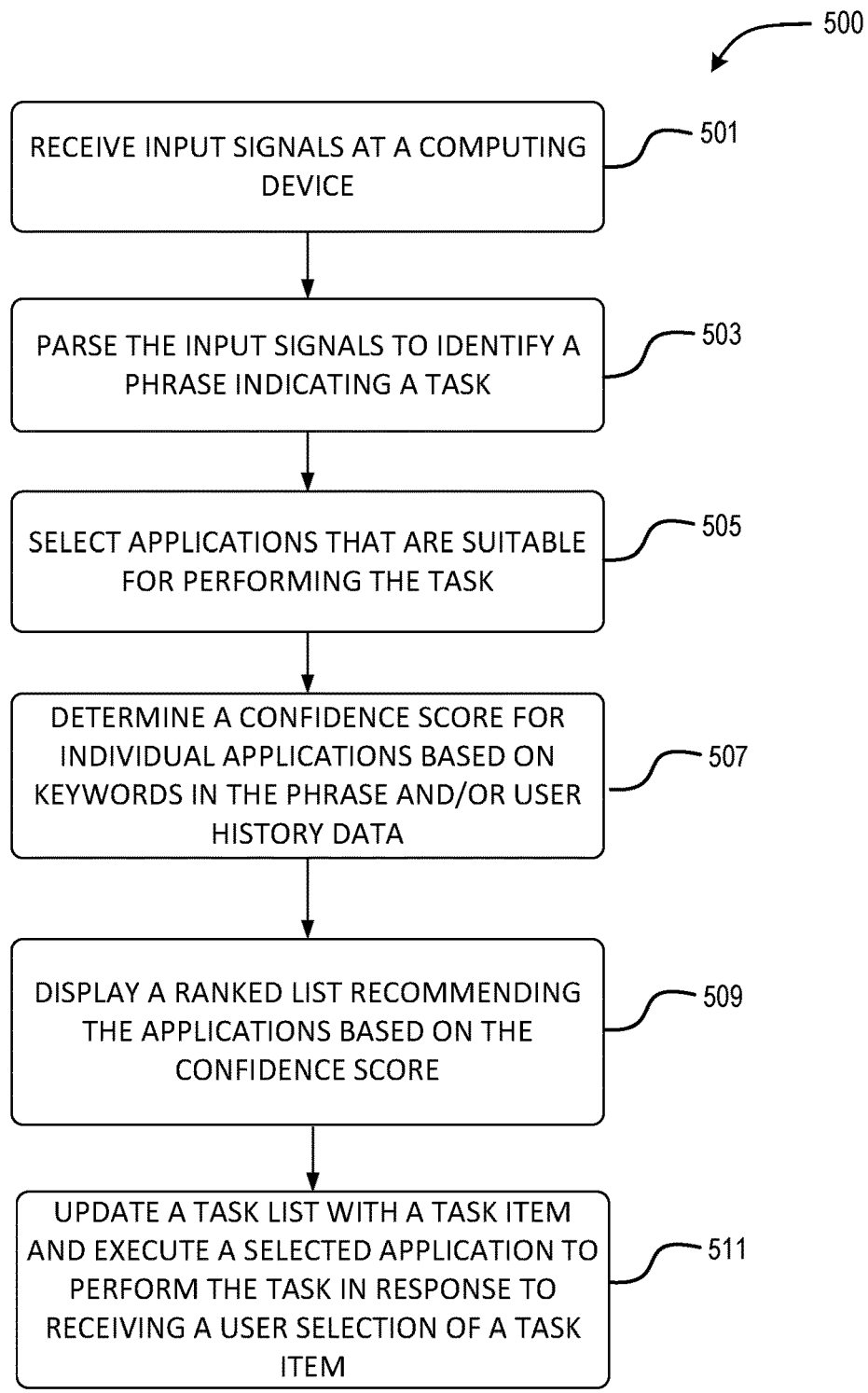
FIG. 5 is a flow diagram showing aspects of a routine for enabling the techniques disclosed herein.

Turning now to FIG. 5, aspects of a routine 500 for enabling the techniques disclosed herein. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where one or more modules of a computing system receive input signals from one or more devices. The input signals can include a voice input, a text input, or any other type of input that includes phrases indicating a task. Thus, a device capturing an input signal can include a keyboard, a camera, a microphone, or any other device that can capture a gesture of the user. In one illustrative example, a home device such as Google Home or an Amazon Echo can provide an input signal for processing. Such information can be documented at a server and communicated to a remote device such as a mobile phone, a tablet, or any other type of personal computer.

Next, at operation 503, one or more modules of a computing system can parse the input signals to identify a phrase indicating a task. For example, one or more machine learning algorithms can be used to interpret the text of an input signal to identify a task. A phrase indicating a task may include a verb such as compose, send, set, etc. Technology can parse objects associated with the verb, such as a person's name. A phrase indicating a task can be, for example, "email Bob" or "call Steve," etc.

At operation 503, a computing system can also retrieve supplemental data related to the phrase. For instance, if a person's name is included in the phrase, the computing system may analyze a number of different databases, including a user's contact list, to obtain a person's last name, email address, address information, etc. The computing system may also retrieve other related data, such as calendar data, organizational data, etc. Such information can be used to determine additional context with respect to a person or object related to the phrase. For instance, organizational data or calendar data can be utilized to determine if a person is a work contact or a personal contact.

Next, at operation 505, one or more modules of a computing system can select one or more applications that are suitable for performing the task. For instance, if the phrase includes the word "compose" or "send," the computing system may select a number of applications such as word processing applications, email applications, no applications, etc. In some implementations, specific tasks may be associated with the category of applications. Each application in that category may be selected at operation 505. Applications may also be selected by the use of contextual data that includes user history information. For example, if a user has provided the phrase "send message" as an input, and in the past the user has utilized a texting application, that texting application may be selected at operation 505 along with other applications such as email applications, web browsers, etc.

Next, at operation 507, one or more modules of a computing device can determine a confidence score for individual applications. The confidence score can be determined by the use of a number of different factors. For instance, the confidence score may be determined by an analysis of keywords in the phrase and user activity data ("historical data"). One or more machine learning algorithms can also be utilized at operation 507.

For instance, machine learning techniques may be utilized to analyze a user's activity history, e.g., which applications have been used in the past for a particular task. As the user interacts with the computer, user activity data is stored and analyzed by one or more machine learning techniques. The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of an application that is relevant to a user's intent and/or situation. Different factors can be used to influence the selection and/or the ranking of an application such as a number of times a user has utilized an application, how recently a user has utilized an application, etc. In addition, machine learning techniques can be utilized to determine a user's intent based on any conditional data referred to herein. Thus, activity and circumstances related to objects and/or people included in the phrase can be utilized to select and/or rank an application, e.g., determine a confidence score.

Different machine learning mechanisms may be utilized. For example, a classification mechanism may be utilized to determine a confidence score. The classification mechanism may classify the applications, keywords or phrases into different categories that provide an indication of whether a particular application is suitable for a task. A confidence score can be associated with each application. In some configurations, more classification categories may be utilized. In other examples, a statistical mechanism may be utilized to determine a confidence score. For example, a linear regression mechanism may be utilized to generate a confidence score that indicates a likelihood that an application is associated with a particular task. Linear regression may refer to a process for modeling the relationship between one variable with one or more other variables. Different linear regression models might be used to calculate the confidence score. For example, a least squares approach might be utilized, a maximum-likelihood estimation might be utilized, or another approach might be utilized.

Next, at operation 509, one or more modules of a computing device can display a ranked list of recommendations based on the confidence score of each application. One example of a ranked list is shown in FIG. 1C. In this example, the ranked list orders the application with the application having the highest confidence score arranged on the left side of the user interface and the other applications are ordered by the confidence score with the application having the lowest confidence score arranged on the far right side of the user interface. A confidence score can also be displayed with each application. In addition, some applications having a confidence score meeting a threshold can be displayed and other applications that do not meet the threshold are not displayed.

Next, at operation 511, or more modules of a computing device can update a task list with a task item in response to a user selection of an application. One illustrative example is shown in FIG. 1F, where a user selects the Outlook icon and in response to such a selection, the task list shown in FIG. 1G is updated with a new task item 112. The task item 112 can include a listing of the captured phrase and a graphical indicator of the selected application, e.g., Outlook.

At operation 511, in response to a user selection of the task item 112, the computing device may execute the selected application to perform the task. The computing device may also populate one or more data fields of the application to assist the user in completing a task. The fields may be populated with supplemental data or data gathered from the phrase provided in the input signal.

In one illustrative example, the routine 500 can include the operation of receiving input signals at a computing device. The routine 500 can also include parsing the input signals to identify a phrase indicating a task. A task can include any type of data manipulation or data processing that can be conducted by a computing device, such as sending an email, sending a message, generating a document, etc. The routine 500 can also include the operation of selecting a plurality of applications that are suitable for performing the task. The applications can include applications, scripts, services, Web-based services, local-services, scripts or any other code for processing data. The routine 500 can also include the operation of determining a confidence score for individual applications of the plurality of applications based on keywords in the phrase. A confidence score can be higher or lower depending on a number of factors, such as, a time period that has lapsed since a user has utilized a particular application, a time period that has lapsed since a user has utilized an application for contacting a particular user, a category of an application in comparison to a category of a keyword in the input signal, etc.

The routine can include generating a ranked list of the plurality of applications based on the confidence score for the individual applications and displaying the ranked list recommending the plurality of applications on a display screen in communication with the computing device, wherein an order of the individual applications within the ranked list is based on an associated confidence score.

In some configurations, a computer can receive a user selection of a selected application from the ranked list of applications. In some configurations, the selection of an application can be made by a computing device based on a comparison of a confidence score with a threshold. In some configurations, the selection of an application can include a highest-ranking application based on the confidence score. In response to the selection of the selected application, the routine can include updating a task list to include a task item providing a description of the task and an indication of the selected application, wherein a selection of the task list causes the execution of the selected application. In some configurations, the routine can include receiving a selection of the task item, and in other configurations, the selection can be automated. In response to the selection of the task item, the routine an include the execution of the selected application for purposes of completing the task. Fields of the application can be populated by data derived from the input signal or from contextual data or supplemental data. In some configurations, the routine can include an operation where a computer can activate the functionality of the selected application based on the individual actions of the task item. For instance, an action defined in a task item can direct the selected application to utilize the functionality of an application that opens a template document or template email. The functionality can include the use of any feature, e.g., a cut, paste, formatting functionality, opening of a specific window such as a new email draft, or any other application function that can be controlled by a macro, script, remote application, source code, a plug-in, add-in, etc.

Figure 6:
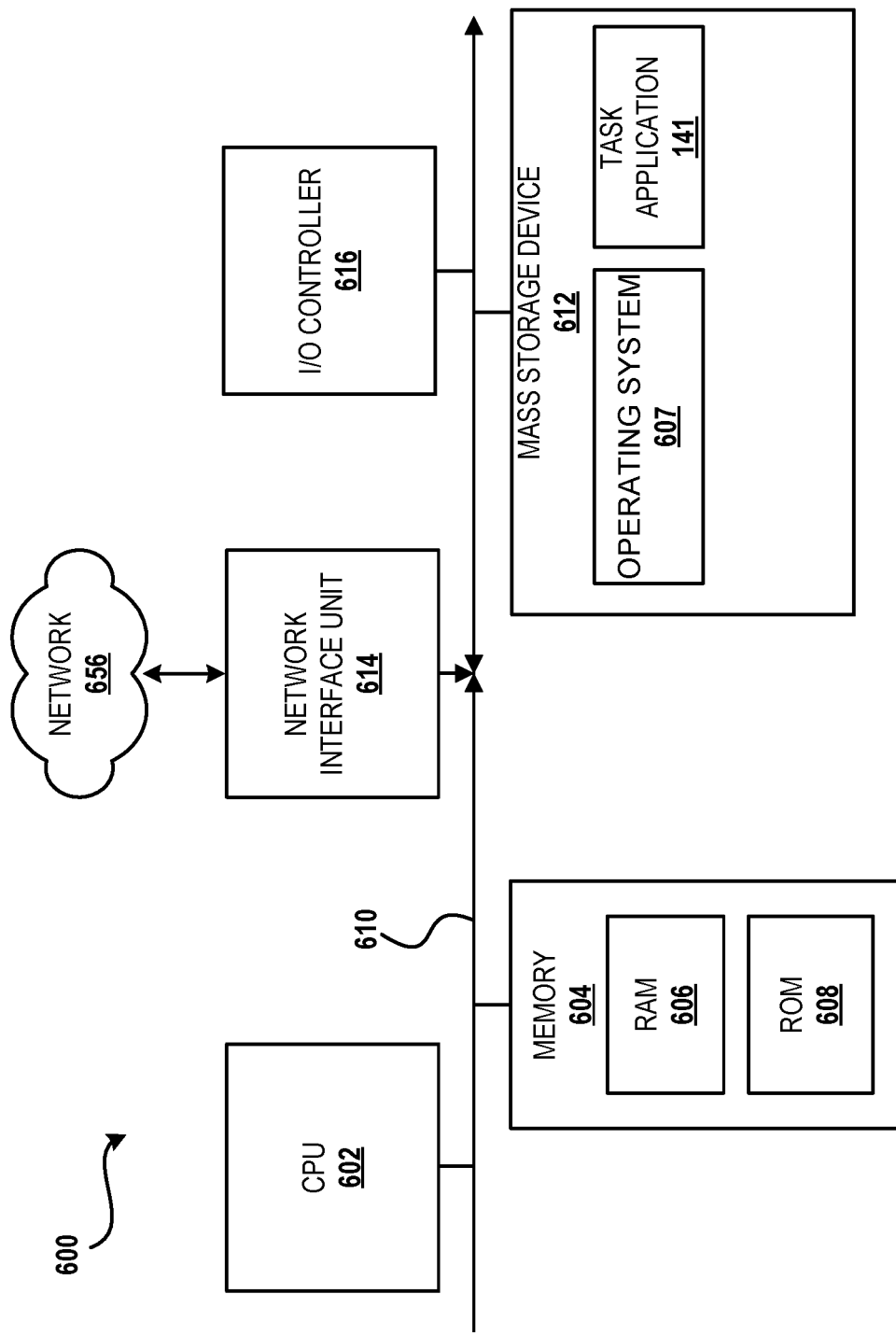
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 106 (FIG. 1), capable of executing the program components described herein. Thus, the computer architecture 600 illustrated in FIG. 6 illustrates an example architecture for a server computer, a mobile phone, a PDA, a smart phone, a desktop computer, a netbook computer, a tablet computer, and/or a laptop computer (not shown in FIG. 6). The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs, such as a task application 141.

The mass storage device 612 is connected to the CPU 602 through a mass storage controller (not shown in FIG. 6) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
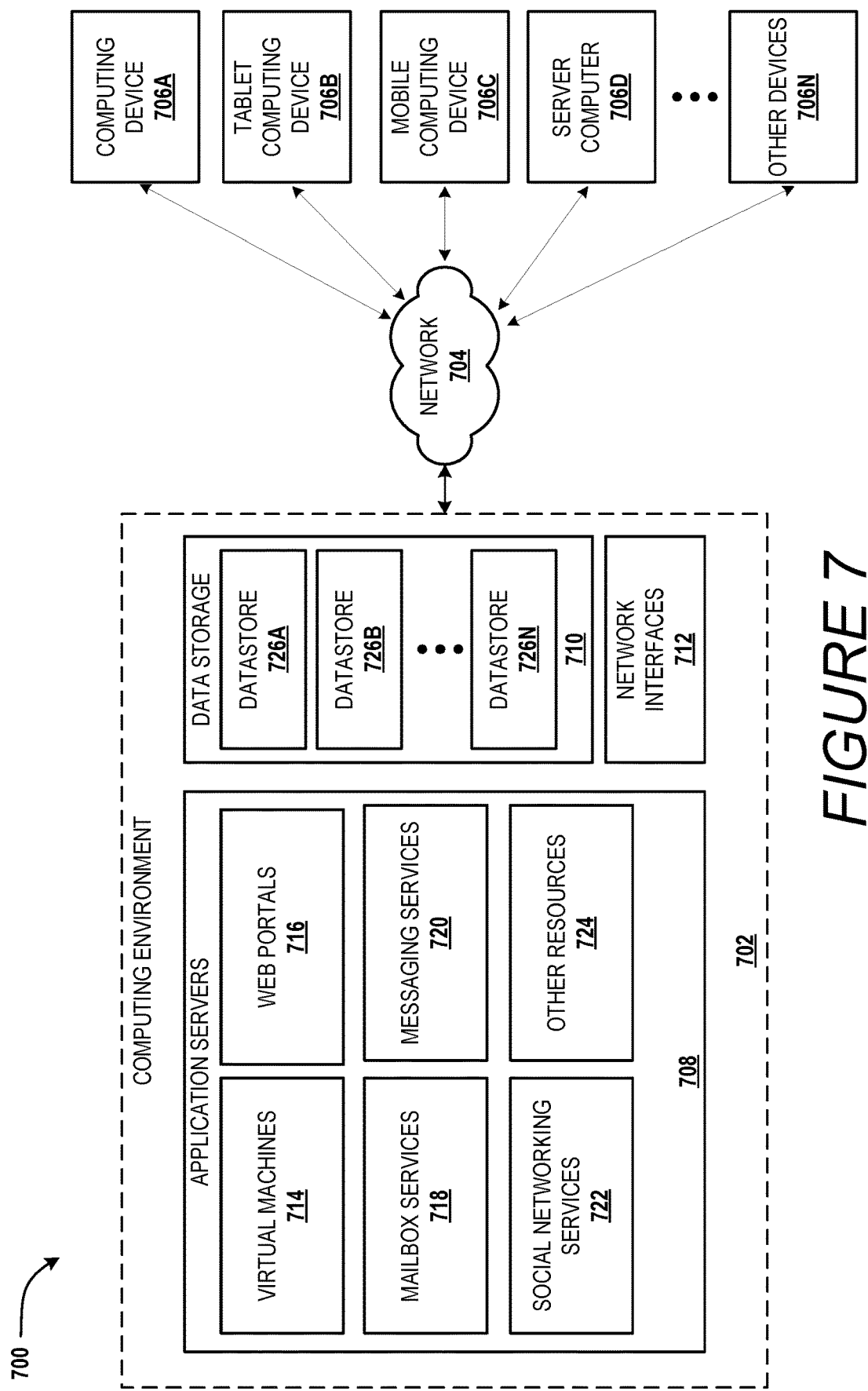
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices, which generate the user interfaces depicted herein) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way. Each client 706 can be used to collect input signals and share them between different clients.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling the generation of content from productivity applications. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein, such as enabling the generation of content from multiple applications. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. The other resources 724 can also include a machine learning engine for processing and generating historical user activity data. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, Word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by a web browser application, which works in conjunction with the application servers 708 of FIG. 7.

Turning now to FIG. 8, an illustrative computing device architecture 800 for a computing device that is capable of executing various software components is described herein for enabling the generation of content from multiple applications. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 7. Moreover, aspects of the computing device architecture 800 may be applicable to traditional desktop computers, portable computers (e.g., phones, laptops, notebooks, ultra-portables, and netbooks), server computers, and other computer systems, such as those described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown in FIG. 8). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown on FIG. 8) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEB OS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 656 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standards (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interfaces described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector (not shown in FIG. 8), which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method, comprising:

receiving input signals at a computing device;

parsing the input signals to identify a phrase indicating a task;

selecting a plurality of applications that are suitable for performing the task;

determining a confidence score for each of the plurality of applications based on one or more keywords in the phrase and one or more factors, wherein the one or more factors include a time of day the input signals are received or a day of a week the input signals are received;

adjusting the confidence score for an individual application using historical user activity data defining at least one previous user selection of the individual application;

generating a ranked list of the plurality of applications based on the confidence scores determined for the plurality of applications;

displaying the ranked list of the plurality of applications on a display screen in communication with the computing device;

receiving a first user selection of a selected application from the ranked list of the plurality of applications;

in response to the first user selection of the selected application, updating a task list to include a task item that includes a description of the task and an indication of the selected application, wherein the task item includes a graphical user interface element configured to, upon selection, activate functionality of the selected application that is capable of completing the task;

automatically generating task data using the input signal and at least one of the historical user activity data or contextual data, wherein the task data comprises a script that defines a list of actions for performing the task using the selected application;

storing the task data in association with the task item;

in association with user access to the task list, receiving a second user selection of the graphical user interface element included in the task item;

in response to the second user selection of the graphical user interface element included in the task item:

retrieving parameter data associated with at least one action in the list of actions defined by the script and populating one or more data fields of the selected application using the parameter data; and activating the functionality of the selected application to complete the list of actions defined by the script based on the one or more data fields populated using the parameter data.

2. The method of claim 1, further comprising:

retrieving supplemental data from a resource based on the parameter data; and populating the one or more data fields of the selected application using the supplemental data.

3. The method of claim 1, further comprising:

receiving updates to the input signals indicating an update to the phrase;

determining an updated confidence score for each of the plurality of applications based on the update to the phrase; and displaying an update to the ranked list of the plurality of applications that is based on the updated confidence scores.

4. The method of claim 1, wherein the confidence score is adjusted by a machine learning algorithm processing the historical user activity data.

5. The method of claim 4, further comprising, storing the historical user activity data for the purposes of processing and generating additional historical user activity data by a machine learning engine.

6. The method of claim 1, wherein the one or more data fields comprise at least one of a contact name, a phone number, an email address, or address information.

7. The method of claim 1, wherein the confidence score is increased in response to a number of selections of the individual application satisfying a threshold number of selections defined by the historical user activity data.

8. A system comprising:

one or more processing units; and a computer-readable medium having encoded thereon computer-executable instructions to cause the one or more processing units to receive input signals at the system;

parse the input signals to identify a phrase indicating a task;

select a plurality of applications that are suitable for performing the task;

determine a confidence score for each of the plurality of applications based on one or more keywords in the phrase and one or more factors, wherein the one or more factors include a time of day the input signals are received or a day of a week the input signals are received;

adjust the confidence score for an individual application using historical user activity data defining at least one previous user selection of the individual application;

generate a ranked list of the plurality of applications based on the confidence scores determined for the plurality of applications;

display the ranked list of the plurality of applications on a display screen in communication with the system;

receive a first user selection of a selected application from the ranked list of the plurality of applications;

in response to the first user selection of the selected application, update a task list to include a task item that includes a description of the task and an indication of the selected application, wherein the task item includes a graphical user interface element configured to, upon selection, activate functionality of the selected application that is capable of completing the task;

automatically generate task data using the input signal and at least one of the historical user activity data or contextual data, wherein the task data comprises a script that defines a list of actions for performing the task using the selected application;

store the task data in association with the task item;

in association with user access to the task list, receive a second user selection of the graphical user interface element included in the task item;

in response to the second user selection of the graphical user interface element included in the task item:

retrieve parameter data associated with at least one action in the list of actions defined by the script and populate one or more data fields of the selected application using the parameter data; and activate the functionality of the selected application to complete the list of actions defined by the script based on the one or more data fields populated using the parameter data.

9. The system of claim 8, where the computer-executable instructions further cause the one or more processing units to retrieve supplemental data from a resource based on the parameter data; and populate the one or more data fields of the selected application using the supplemental data.

10. The system of claim 8, wherein the computer-executable instructions further cause the one or more processing units to receive updates to the input signals indicating an update to the phrase;

determine an updated confidence score for each of the plurality of applications based on the update to the phrase; and display an update to the ranked list that is based on the updated confidence scores.

11. The system of claim 8, wherein the confidence score is adjusted by a machine learning algorithm processing the historical user activity data.

12. The system of claim 11, where the computer-executable instructions further cause the one or more processing units to store the historical user activity data for processing and generating additional historical user activity data by a machine learning engine.

13. The system of claim 8, wherein the one or more data fields comprise at least one of a contact name, a phone number, an email address, or address information.

14. A computer-readable storage medium having encoded thereon computer-executable instructions that cause one or more processing units of a computing device to:

parse input signals to identify a phrase indicating a task;

select a plurality of applications that are suitable for performing the task;

determine a confidence score for each of the plurality of applications based on one or more keywords in the phrase and one or more factors, wherein the one or more factors include a time of day the input signals are received or a day of a week the input signals are received;

adjust the confidence score for an individual application using historical user activity data defining at least one previous user selection of the individual application;

generate a ranked list of the plurality of applications based on the confidence scores determined for the plurality of applications;

display the ranked list of the plurality of applications on a display screen in communication with the computing device;

receive a first user selection of a selected application from the ranked list of the plurality of applications;

in response to the first user selection of the selected application, update a task list to include a task item that includes a description of the task and an indication of the selected application, wherein the task item includes a graphical user interface element configured to, upon selection, activate functionality of the selected application that is capable of completing the task;

automatically generate task data using the input signal and at least one of the historical user activity data or contextual data, wherein the task data comprises a script that defines a list of actions for performing the task;

store the task data in association with the task item;

in association with user access to the task list, receive a second user selection of the graphical user interface element included in the task item;

in response to the second user selection of the graphical user interface element included in the task item:
retrieve parameter data associated with at least one action in the list of actions defined by the script and populate one or more data fields of the selected application using the parameter data; and activate the functionality of the selected application to complete the list of actions defined by the script based on the one or more data fields populated using the parameter data.

15. The computer-readable storage medium of claim 14, where the computer-executable instructions further cause the one or more processing units to retrieve supplemental data from a resource based on the parameter data; and populate the one or more data fields of the selected application using the supplemental data.

16. The computer-readable storage medium of claim 14, wherein the computer-executable instructions further cause the one or more processing units to receive updates to the input signals indicating an update to the phrase;

determine an updated confidence score for each of the plurality of applications based on the update to the phrase; and display an update to the ranked list that is based on the updated confidence scores.

17. The computer-readable storage medium of claim 14, where the computer-executable instructions further cause the one or more processing units to store the historical user activity data for processing and generating additional historical user activity data by a machine learning engine.

18. The computer-readable storage medium of claim 14, wherein the one or more data fields comprise at least one of a contact name, a phone number, an email address, or address information.

* * * * *